United States Patent Office 3,629,438
Patented Dec. 21, 1971

3,629,438
BENZOTHIOPHENE-1,1-DIOXIDE DERIVATIVES
AS FUNGICIDES AND BACTERICIDES
Bogislav von Schmeling, Hamden, and Robert A. Davis, Cheshire, Conn., and Douglas I. Relyea, Pompton Plains, N.J., assignors to Uniroyal, Inc., New York, N.Y.
No Drawing. Filed Jan. 23, 1969, Ser. No. 793,562
Int. Cl. A01n 9/14
U.S. Cl. 424—275                                   6 Claims

ABSTRACT OF THE DISCLOSURE

Benzothiophene - 1,1 - dioxide derivatives have been found to be effective fungicidal and bactericidal compounds. Included in the scope of pathogens which are inhibited or destroyed by these compounds are fungi and bacteria which cause plant disease and textile rotting, and, as well, fungi and bacteria which exhibit mammalian pathogenicity.

---

This invention relates to the discovery of broad fungicidal and bactericidal activity in benzothiophene - 1,1-dioxide derivatives of the following generic formula:

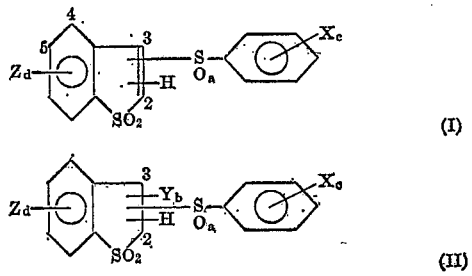

The structural representation of Formula I is meant to indicate that the

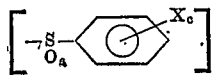

or H substituent can be at either the 2 or 3 position of the benzothiophene-1,1-dioxide ring system. Similarly, substituent Y in Formula II can be found in the 2 and/or 3 positions of the compound.

X is halogen, nitro, alkyl, alkoxy, haloalkyl, carboxy and sulfonyl halide; Y is hydrogen, lower alkyl, lower alkoxy, halo and hydroxy; Z is alkyl, alkoxy, halo, carboxy, haloalkyl and nitro; $a$, $c$ and $d$ are independently valued: $a$ may be 0 or 2, $b$ is 2, $c$ may be 0 or an integer from 1 to 5 and $d$ may be 0 or an integer from 1 to 4.

Examples of X are methyl, dimethyl, ethyl, isopropyl, n-butyl, t-butyl, hexyl, octyl, methoxy, propoxy, chloro, dichloro, bromo and nitro.

Additional examples of Y and Z are methyl, ethyl, propyl, t-butyl, methoxy, chloro, bromo, iodo and fluoro.

The aforesaid compounds are prepared by reactions not previously known in the art. Briefly, the method involves reacting benzothiophene-1,1-dioxide with an appropriate organic sulfenyl chloride (RS Cl) and then dehydrohalogenating the reaction product with a strongly basic reagent to produce the 2-(R-thio) benzo [b] thiophene-1,1-dioxide derivative; isomerization of these derivatives into their 3-(R-thio) isomers is accomplished by heating with a strongly basic reagent; the (R-thio) derivatives also can be oxidized to the sulfonyl compounds ($RSO_2$). A fully detailed description of these reactions is contained in the copending application of D. I. Relyea, Ser. No. 793,561, filed of even date herewith and assigned to the assignee of the instant application.

In order to illustrate the invention more fully attention is directed to the following examples:

EXAMPLE 1

The chemicals of this invention were evaluated as foliage fungicides for protection of plants from subsequent infection by fungus organisms.

One gram of the chemical to be tested was ground with three ml. of acetone and 50 mg. of a non-ionic surface-active agent (a condensation product of an alkyl phenol and ethylene oxide). The acetone and surface-active agent were found to be inactive in these biological tests. The mixture was diluted with water, giving suspensions containing 2000 p.p.m. of the chemical. Lower concentrations were obtained by serial dilutions of the 2000 p.p.m. starting solution. The suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and 100% relative humidity. In the morning the plants were transferred to the greenhouse. Three days later the disease was scored by comparing the number of disease lesions of the treated plants with the untreated check.

The formula to determine percent control is:

$$100 - \frac{\text{Avg. no. lesions on treated plant}}{\text{Avg. no. lesions on untreated plant}} \times 100$$

$$= \text{percent control}$$

The following chemicals were found to provide effective protection against infection of tomato by the fungus, *Alternaria solani*:

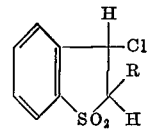

| | | Tomato early blight test | |
|---|---|---|---|
| Code | R= | Percent control of disease | Dosage, p.p.m. |
| G-645 | 2-phenylthio | 98 / 96 | 31 / 16 |
| H-053 | 2-(4-chlorophenylthio) | 95 / 87 | 62 / 31 |
| H-643 | 2-(3-methylthio) | 96 / 93 | 62 / 31 |
| H-184 | 2-phenylthio | 99 / 97 | 31 / 16 |
| H-337 | 2-(4-bromophenylthio) | 91 / 81 | 125 / 62 |
| H-338 | 2-(4-chlorophenylthio) | 78 / 82 | 62 / 31 |
| H-441 | 2-phenylsulfonyl | 90 / 84 | 125 / 62 |
| H-443 | 3-phenyl sulfonyl | 95 / 85 | 250 / 62 |
| H-833 | 2(3-methylphenylthio | 99 / 95 | 62 / 31 |
| Comparative test compounds | | | |
| H-644 | 2-(phenylthio)-3-chlorotetrahydrothiophene-1,1-dioxide | 79 | 500 |
| D-322 | Trans-3-chloro-4-phenylthio tetrahydrothiophene-1,1-dioxide | 79 | 500 |

EXAMPLE 2

This example evaluates the chemicals of this invention as bactericides as follows:

Thirty-five milligrams (or less) of chemicals are dissolved in 5 ml. acetone to which 45 ml. of a 0.01% aqueous solution of a wetting agent (e.g. Triton X–100) is added. Three ml. of this preparation was pipetted into a 50 ml. Erlenmeyer flask containing 5 ml. nutrient agar and kept liquified at 48° C. The bacterial inoculum consisting of a cell suspension of *Staphylococcus aureus* was then added to the nutrient chemical preparation in the amount of 0.25 ml. per flask. Thus the flasks contained a chemical concentration of 225 p.p.m. or less. The nutrient-chemical-bacterial mixture was poured into 2½ inch plastic Petri dishes, allowed to harden and incubated at 30° C. Observations for growth were made at 24, 48, 72 and 168 hours. The chemical treatments were compared with an untreated, inoculated control using a bacterial growth evaluation of growth (+) or no growth (0). The results are as follows:

| Code | R= | Y= | Bacterial growth at dilution (p.p.m.) after 48 hours incubation |||||||||
|---|---|---|---|---|---|---|---|---|---|---|---|
| | | | 225 | 128 | 64 | 32 | 16 | 8 | 4 | 2 | 1 |
| G–645 | (Phenylthio) | Cl | 0 | 0 | 0 | 0 | 0 | 0 | 0 | + | + |
| H–302 | (4-nitrophenylthio) | Cl | 0 | 0 | 0 | 0 | 0 | + | + | + | + |
| H–317 | (3-chlorophenylthio) | H | 0 | 0 | 0 | + | + | + | + | + | + |
| H–643 | (3-methylphenylthio) | Cl | 0 | 0 | 0 | 0 | 0 | 0 | 0 | 0 | + |
| H–316 | (4-nitrophenylthio) | | 0 | 0 | 0 | 0 | 0 | 0 | 0 | 0 | 0 |
| H–184 | Phenylthio | | 0 | 0 | 0 | 0 | + | + | + | + | + |
| H–441 | Phenylsulfonyl | | 0 | 0 | 0 | 0 | 0 | + | + | + | + |
| H–833 | 3-methylphenylthio | | 0 | 0 | 0 | 0 | + | + | + | + | + |

EXAMPLE 3

This example demonstrates the effectiveness of the chemicals of this invention as industrial bactericides. In this test, weighed portions of the compounds were dissolved in 10 ml. of an appropriate solvent (acetone, isopropanol, distilled water), and transferred to 90 ml. of distilled water containing Triton X–100 (5 drops/l.). Aliquots were removed from this stock solution (usually containing 1,000 or 100 p.p.m. of chemical) to sterile, screw capped, clear one oz. bottles sufficient to obtain a final concentration of 1, 5, 10, 50 and 100 p.p.m. To each bottle was added sulfate reducing broth inoculated with *Desulfovibrio desulfuricans* (1.5%). The broth formulation is that of the American Petroleum Institute. The caps were replaced and the bottles incubated at 22–35° C. with daily observations for one week and weekly observations thereafter for a total of 4 weeks' incubation.

| Compound | Bacterial growth at concentration in p.p.m. |||||
|---|---|---|---|---|---|
| | 100 | 50 | 10 | 5 | 1 |
| G–645 | − | − | − | − | + |
| H–184 | − | − | − | − | − |
| H–441 | − | − | + | + | + |
| H–316 | − | + | + | + | + |

NOTE.—+=Growth and media blackening. −=No growth or blackening.

EXAMPLE 4

This example illustrates the effectiveness of the chemicals of this invention as fungicides when applied to textiles, wood (cellulosic material), paint, etc.

Ten ounce duck was treated with the chemicals so as to place a deposition of 1% active ingredient on the fibers. The compounds were applied from an acetone solution. The treated duck specimens were dried at 60–65° C. for 15 minutes. The samples were then subjected to a mildew resistance test in accordance with the Non-Sterile Specimen Method of Federal Specification CCC–T–1916. The test organism was *Chaetomium globosum* USDA 1334.2 and incubation was for 14 days at 28–30° C. Leached samples (24 hours immersion with 6 hand changes of water) were also tested.

| Compound treatment (1%) | Two week incubation—visual evaluation of growth ||
|---|---|---|
| | Unleached | Leached |
| None | Moderate | Moderate. |
| G–645 | None | None. |
| H–184 | do | Do. |
| H–317 | do | Do. |
| H–441 | do | Do. |
| H–643 | do | Do. |

EXAMPLE 5

Compounds of the invention were tested against microorganisms which possess mammalian pathogenicity. These include *Streptococcus* var. *hemolyticus* (human), *Trichophyton mentagrophytes* and *Trichophyton rubrum*.

Each sample, on the day it was to be tested was made up in the following fashion: 200 mgs. of the sample was weighed out very accurately; dissolved in 20 cc. of acetone or 20 cc. of DMSO(a) and 1.0 ml. of 10% Tween 80 (b) was added. This represented a stock solution of 10,000 p.p.m. Dilutions from the stock were made in sterile distilled water and, from those dilutions, 1 cc. aliquots were added to the respective mediums in such a fashion that the concentrations of each sample evaluated were 1000, 300, 300, 100, 50, 25, 10, and 5 p.p.m. Each series was prepared and tested in duplicate.

(a) Dimethyl sulfoxide (DMSO) was used to make up sample A–157 only.

(b) Tween 80 is ester of polyoxyethylated sorbitan monooleate containing 20 moles of ethylene oxide

| Compound* | Inhibiting Conc. in p.p.m. against organism |||
|---|---|---|---|
| | St. hemolyticus | T. mentagrophytes | T. rubrum |
| H–184 | 10 | 5 | 5 |
| G–645 | 10 | 10 | 10 |
| A–157 (Commercial standard) | 5 | 5 | 5 |

*A–157—2-pyridinethiol-1-oxide.

The compounds of the invention are highly effective against the above microorganisms. The activity shown indicates that these chemicals are useful against pathogenic human skin microorganisms such as those causing dandruff. A-157 is a principal component in commercial dandruff shampoo; and *T. mentagrophytes* is believed to cause the condition known as athlete's foot (see U.S. 3,385,755).

These compounds or derivatives, although they may occasionally be used by themselves, will normally be employed in a composition which comprises the active compound of this invention in association with an acceptable vehicle. The term "vehicle" is used herein to denote the wide variety of carriers, surfactants, extenders, or diluents, which may find service in compositions containing compounds or derivatives of this invention, and is qualified by the term "acceptable" only in that it excludes any possibility that the nature of the composition, considered in relation to the route by which it is intended to be administered, or the use to which it is to be put, could be harmful rather than beneficial. The choice of a suitable mode of presentation for any desired administration or application is completely within the competence of persons skilled in the art. The preferred active chemical is 2-(phenylthio) benzothiophene-1,1-dioxide.

It will be apparent to those in the art that the compounds of the invention can find extensive use as fungicides and bactericides in a wide variety of ways. The specific uses shown herein are, of course, only exemplary. For instance, they can be used as foliar, seed or soil treatments to protect crops, such as corn, cotton, soybeans and peanuts or small grains such as wheat or barley from destruction by fungi and bacteria. This protection can be afforded to the crop both in situ during the growing season, or after harvest under storage conditions. Moreover, it should be apparent that the chemicals of the invention can be used in admixture with each other and/or with other known fungicides or bactericides.

It is important to note, however, that owing to an apparent photosensitivity in the ultraviolet (UV) range, these compounds are preferably used under conditions of low UV-light exposure. Such conditions are commonly found in situations where practice of the invention is to be expected: greenhouse crop protection (greenhouse glass effectively blocks UV); protection of stored food stuffs or textiles (indoor storage); pharmaceutical uses (easily packaged in UV-absorbing container, rarely will be used at harmful levels of UV).

It should be understood that all variations of the invention which do not depart from its spirit and scope, and which basically rely on the teachings disclosed herein, are considered to be within the invention as described and claimed herein.

Having thus described our invention, what we claim and desire to protect by Letters Patent is:

1. A method of killing fungi and bacteria which comprises applying to said fungi and bacteria, a bactericidally and fungicidally effective amount of a compound of the formulae:

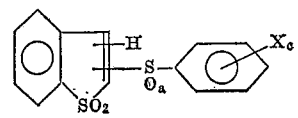

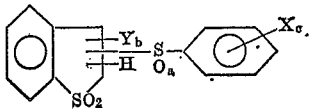

wherein X is selected from the group consisting of halogen, nitro and lower alkyl; $y$ is selected from the group consisting of hydrogen and halo; $a$ is 0 or 2, $b$ is 2 and $c$ is 0 or 1.

2. The method of claim 1 wherein the

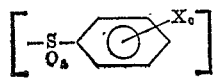

group is in the 2-position.

3. The method of claim 1 wherein the

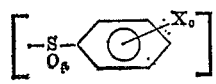

group is in the 3-position.

4. The method of claim 1 wherein $a$ is 0.

5. The method of claim 1 wherein X is selected from the group consisting of Cl, Br, $NO_2$, $CH_3$ and $(CH_3)_3C$; $y$ is selected from the group consisting Cl and Br; and $c$ is 1.

6. A method of killing fungi and bacteria which comprises applying to said fungi and bacteria, a fungicidally and bactericidally effective amount of 2 - (phenylthio) benzothiophene-1,1-dioxide.

References Cited

UNITED STATES PATENTS 2,557,673  6/1951  McKellin et al. ___ 260—330.5

OTHER REFERENCES

Bordwell et al. (I): Jacs 76:3637–9 (1954).
Bordwell et al. (II): Jacs 82:2878–81 (1960).
Mustafa et al.: Jacs 79–3500–2 (1957).

ALBERT T. MEYERS, Primary Examiner

L. SCHENKMAN, Assistant Examiner